US011986846B1

(12) United States Patent
Nichols et al.

(10) Patent No.: US 11,986,846 B1
(45) Date of Patent: May 21, 2024

(54) APPARATUS AND METHOD FOR DISPLAYING DIGITAL CONTENT ONTO A VEHICLE

(71) Applicant: Quick Quack Car Wash Holdings, LLC, Roseville, CA (US)

(72) Inventors: Joseph Matthew Nichols, Rocklin, CA (US); Christopher Clinton Chappell, Lincoln, CA (US); McNamara Marlow Pope, III, Fair Oaks, CA (US); Rodney Daniel Sparks, Antelope, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/195,675

(22) Filed: May 10, 2023

(51) Int. Cl.

| | |
|---|---|
| ***B05B 12/12*** | (2006.01) |
| ***B05B 7/00*** | (2006.01) |
| ***B05B 12/14*** | (2006.01) |
| ***B05C 11/10*** | (2006.01) |
| ***B05D 1/02*** | (2006.01) |
| *B08B 3/00* | (2006.01) |

(52) U.S. Cl.
CPC .......... *B05B 12/122* (2013.01); *B05B 7/0018* (2013.01); *B05B 12/1418* (2013.01); *B05C 11/1021* (2013.01); *B05D 1/02* (2013.01); *B08B 3/003* (2013.01)

(58) Field of Classification Search
None
See application file for complete search history.

(56) References Cited

U.S. PATENT DOCUMENTS

| | | | | |
|---|---|---|---|---|
| 5,413,128 | A * | 5/1995 | Butts | B60S 3/04 134/123 |
| 9,323,137 | B1 * | 4/2016 | Secord | G03B 21/001 |
| 11,518,299 | B2 | 12/2022 | Hu | |
| 2017/0333799 | A1 | 11/2017 | Park | |
| 2017/0354996 | A1 * | 12/2017 | Lim | B08B 3/003 |
| 2020/0282958 | A1 * | 9/2020 | Stephenson | G08G 1/017 |

* cited by examiner

*Primary Examiner* — Binu Thomas
(74) *Attorney, Agent, or Firm* — Caldwell Intellectual Property Law

(57) ABSTRACT

An apparatus and method for displaying digital content onto a vehicle, the apparatus including a foam apparatus, a sensor configured to detect vehicle dimension data, at least a processor and a memory communicatively connected to the at least a processor, wherein the memory contains instructions configuring the at least a processor to receive the vehicle dimension data, calculate a concentration requirement based on the vehicle dimension data, transmit the concentration requirement to the foam apparatus, wherein the foam apparatus is configured to disperse foam onto the vehicle based on the concentration requirement, and a display device including a digital content projector, wherein the display device is configured to display a plurality of digital content onto the foam dispersed onto the vehicle.

18 Claims, 7 Drawing Sheets

APPARATUS AND METHOD FOR DISPLAYING DIGITAL CONTENT ONTO A VEHICLE

FIELD OF THE INVENTION

The present invention generally relates to the field of displaying digital content. In particular, the present invention is directed to an apparatus and method for displaying digital content onto a vehicle.

BACKGROUND

Current methods for displaying digital content to not optimize applications for a vehicle setting. There is a need for a method of displaying digital content onto vehicle by incorporating the specifics of a vehicle.

SUMMARY OF THE DISCLOSURE

In an aspect, an apparatus for displaying digital content onto a vehicle, the apparatus including a foam apparatus, a sensor configured to detect vehicle dimension data, at least a processor and a memory communicatively connected to the at least a processor, wherein the memory contains instructions configuring the at least a processor to receive the vehicle dimension data, calculate a concentration requirement based on the vehicle dimension data, transmit the concentration requirement to the foam apparatus, wherein the foam apparatus is configured to disperse foam onto the vehicle based on the concentration requirement, and a display device including a digital content projector, wherein the display device is configured to display a plurality of digital content onto the foam dispersed onto the vehicle.

In another aspect, a method for displaying digital content onto a vehicle, the method including determining, by a sensor, vehicle dimension data of a vehicle, calculating, by a computing device, a concentration requirement based on the vehicle dimeson data, dispersing, by a foam apparatus, foam on onto the vehicle based on the concentration requirement, displaying, by a display device, a plurality of digital content onto the foam dispersed onto the vehicle.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for displaying digital content onto a vehicle. In an embodiment, apparatus and method may be used in a carwash facility.

Aspects of the present disclosure can be used to detect the windscreen of a vehicle entering a carwash to determine dimensions and other factors that may optimize the display of digital content onto the windscreen while the vehicle goes through the carwash.

Exemplary embodiments illustrating aspects of the present disclosure are described below in the context of several specific examples.

Figure 1A:
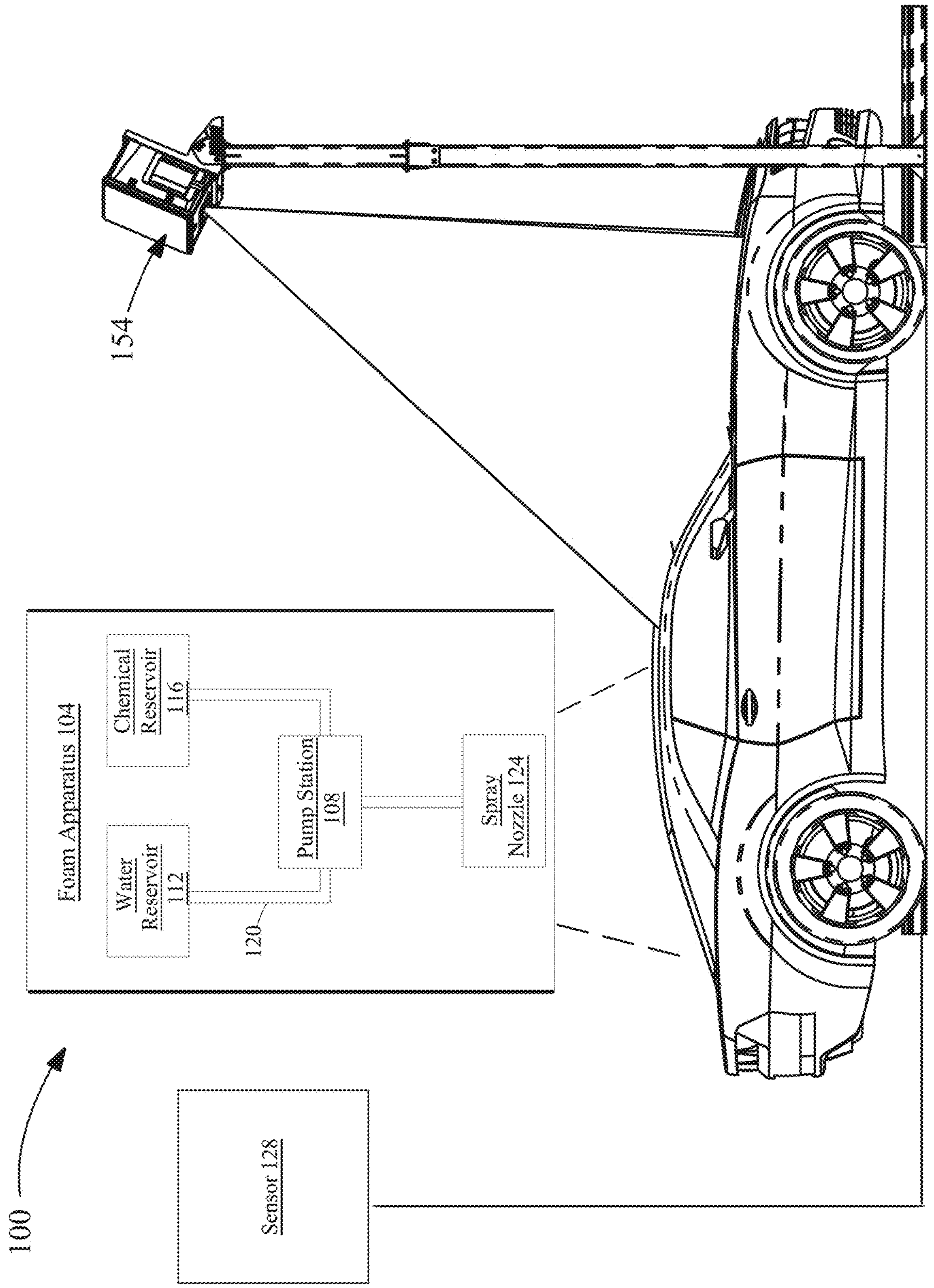
FIG. 1A is a block diagram of an exemplary embodiment of an apparatus for displaying digital content onto a vehicle.

Referring now to FIG. 1A, an exemplary embodiment of an apparatus 100 for displaying digital content onto a vehicle is illustrated. Apparatus 100 includes a foam apparatus 104 configured to disperse foam on a vehicle. "Foam," as used herein, is a mass of fine bubbles. The bubbles may be formed in or on the surface of a liquid or from a liquid. A "vehicle," as used herein, is transportation apparatus. For example, a vehicle may be car, truck, cart, and the like. The foam may include a semi-translucent foam configured to cover windows of a vehicle. "Semi-translucent foam," as used herein is foam that partially allows the passage of light through it. A "window of a vehicle," as used herein, is a transparent opening in a vehicle that a user of the vehicle may look through. A window of a vehicle may include, as non-limiting examples, windscreens, side and rear windows, and glass panel roofs on a vehicle. Foam may include snow foam. "snow foam," a used herein is foamed detergent configured to dwell on a surface for a period of time before rinsing. Snow foam may be a white foam detergent that activates when sprayed onto a surface. For example, snow foam may be sprayed onto a vehicle at the begging of a car wash process. Foam may be composed of alcohols, vinegars, soaps, water, an aqueous film forming foam concentrate, fluorocarbon or hydrocarbon surfactants, various solvents and stabilizers, gels, and the like. Foam apparatus 104 may include a pump station 108, a water line, a chemical reservoir 116, supply lines 120, and a spray nozzle 124. A "pump station," a used herein, is holding chamber that pumps liquids to a required area. The spray nozzle 124 may be configured to disperse the mixture as a foam onto one of more windows of a vehicle.

Still referring to referring to FIG. 1A, pump station 108 includes one or more pumps. A pump may include a substantially constant pressure pump (e.g., centrifugal pump) or a substantially constant flow pump (e.g., positive displacement pump, gear pump, and the like). The pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed.

Still referring to FIG. 1A, one or more pumps may be connected to a water reservoir 112 and a chemical reservoir 116. For example, a first pump may be connected to the water reservoir 112 and a second pump may be connected to the chemical reservoir 116. A "water reservoir," as used herein, is storage tank for water. The water stored may be the water to be used to form the semi-translucent foam, or water to be dispersed throughout a carwash facility. A "chemical reservoir," as used herein, is a storage tank for chemicals. The chemical reservoir may include a plurality of chambers storing a chemical. For example, alcohols, vinegars, soaps, hydrocarbon surfactants, various solvents and stabilizers, gels, and the like, may be stored in separate chambers. The water reservoir 112 and the chemical reservoir 116 may be connected to the pumps by a supply line 120. A "supply line 120," as use herein, is an apparatus that transfers a substance. A supply line 120 may be made of plastic and metals and the like. For example, the supply line 120 may be a metal tube, pipe, and the like. The supply line may include a plurality of ends, for example, a first end connected to the water reservoir 112, a second end connected to the chemical reservoir 116, and a third end connected to the pump(s). The supply line 120 may allow for the mixture of the water and chemicals within the line when transferring the water and chemicals from the reservoirs to the pump. The pump may then transfer the mixture to a spray nozzle 124. A "spray nozzle," as used herein, is a device that facilitates the dispersion of a substance by the formation of a spray. The production of a spray may include the fragmentation of liquid structures, such as liquid sheets or ligaments of the mixture contained in the supply line 120, into droplets. A spray nozzle 124 may include a hydraulic spray nozzle 124 such as flat fan nozzles, hollow cone nozzles, full cone nozzles, solid stream nozzles, and the like. The spray nozzle 124 may be positioned in a way to disperse foam onto a vehicle as described further below. For example, in a car wash setting, when a vehicle approaches foam apparatus, the spray nozzle 124 may be positioned at an angle of a downward stream to disperse the foam onto the vehicle.

Still referring to FIG. 1A, apparatus 100 includes a sensor 128. Sensor 128 may be configured to confirm an adequate display condition on the vehicle, wherein the adequate display condition includes an identification of a display area and a determination of the concentration requirement 144. A "sensor," a used herein, is a device that determines a physical property. In some embodiments, a plurality of sensors 128 may be located at various points within the facility. For example, a sensor 128 may be located at entrance of a carwash and attached the foam apparatus 104. Sensor 128 may include gyroscopes, geolocation sensors 128, and the like. Sensor 128 may include an optical sensor. An "optical sensor, as used herein, is a sensor that converts light rays into an electronic signal. The purpose of an optical sensor may to measure a physical quantity of light and, depending on the type of sensor, then translates it into a form that is readable by an integrated measuring device, such as a computing device 132 as described further below. Optical sensors may be used for contact-less detection of a vehicle entering a wash and the, counting or positioning of parts of vehicle, and the like. An optical sensor may include a photoconductive device used to measure the resistance by converting a change of incident light into a change of resistance. An optical sensor may include a photovoltaic cell (solar cell) that converts an amount of incident light into an output voltage. An optical sensor may include photodiodes that convert an amount of incident light into an output current. Examples of an optical sensor include through-beam sensors, retro-reflective sensors, diffuse reflection sensors, and the like.

Still referring to FIG. 1A, sensor 128 may include a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. A camera may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor 136 and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, detect and decode barcodes; capture images; and record video. A camera and images may include embodiments as disclosed in U.S. patent application Ser. No. 18/195,537, filed on May 10, 2023, entitled "APPARATUS AND METHOD FOR AUTOMATIC LICENSE PLATE RECOGNITION OF A VEHICLE," the entirety of which is incorporated as a reference.

With continued reference to FIG. 1A, in some embodiments, a plurality of cameras may include at least a photodetector. For the purposes of this disclosure, a "photodetector" is any device that is sensitive to light and thereby able to detect light. In some embodiments, the at least a photodetector may be implemented in a camera. As a non-limiting example, the at least a photodetector may convert the light into electrical signals that can be processed by the camera's electronics to create an image. In some embodiments, the at least a photodetector may be implemented in the LiDAR system as described below. As a non-limiting example, the at least a photodetector may receive laser light from a light detecting and ranging (LiDAR) system that reflects off an object, such as but not limited to a vehicle, or environment and may convert it into an electrical signal, such as but not limited to LiDAR data of plurality of vehicle images 108 For the purposes of this disclosure, a "light detection and ranging system" is a system for determining ranges by targeting an object or a surface with a laser and measuring the time for the reflected light to return to a receiver. As a non-limiting example, the LiDAR system may include a range-imaging camera, wherein the range-imaging camera that may be included in image capturing device, that may include Intel® RealSense™ D430 Module, from Intel® of Mountainview, California, U.S.A. The D430 Module may include active infrared (IR) illumination and a stereoscopic camera, having global shutters and frame rate of up to 90 fps. The D430 Module may provide a field of view (FOV) of 85.2o (horizontal) by 58o (vertical) and an image resolution of 1280×720. In some embodiments, the range-sensing camera may be operated independently by dedicated hardware, or, in some cases, range-sensing camera may be operated by a computing device 132. In some cases, the range-sensing camera may include software and firmware resources (for execution on hardware, such as without limitation dedicated hardware or a computing device 132). The D430 Module may be operated using software resources including but not limited to Intel® RealSense™ SDK 2.0, which may include opensource cross platform libraries.

Still referring to FIG. 1A, in some embodiments, LiDAR system may include an optical source. For the purposes of this disclosure, an "optical source" is any device configured to emit electromagnetic radiation. As a non-limiting example, the electromagnetic radiation (also referred as light, laser, laser light, and the like) may include ultraviolet (UV), visible light, infrared light, and the like. In some embodiments, the LiDAR system may emit the electromagnetic radiation to an object such as but not limited to a vehicle using the optical source. In some cases, the optical source may include a non-coherent optical source configured to emit non-coherent light, for example a light emitting diode (LED). In some cases, the optical source may emit a light having substantially one wavelength. In some cases, the optical source may emit the light having a wavelength range. The light may have a wavelength in an ultraviolet range, a visible range, a near-infrared range, a mid-infrared range, and/or a far-infrared range. For example, in some cases the light may have a wavelength within a range from about 100 nm to about 20 micrometers. For another example, in some cases the light may have the wavelength within a range from about 500 nm to about 1550 nm. The optical source may include, one or more diode lasers, which may be fabricated, without limitation, as an element of an integrated circuit; diode lasers may include, without limitation, a Fabry Perot cavity laser, which may have multiple modes permitting outputting light of multiple wavelengths, a quantum dot and/or quantum well-based Fabry Perot cavity laser, an external cavity laser, a mode-locked laser such as a gain-absorber system, configured to output light of multiple wavelengths, a distributed feedback (DFB) laser, a distributed Bragg reflector (DBR) laser, an optical frequency comb, and/or a vertical cavity surface emitting laser. The optical source may additionally or alternatively include a light-emitting diode (LED), an organic LED (OLED) and/or any other light emitter.

With further reference to FIG. 1A, in some embodiments, LiDAR system may include a scanner. For the purposes of this disclosure, a "scanner" is a rotating mirror or prism that directs laser in different directions. In some embodiments, the scanner may scan the laser in a horizontal, vertical pattern and wide arrange of angles to create a 3D point cloud of an object such as but not limited to a vehicle or environment. Additionally, or alternatively, LiDAR system may include timing electronics. For the purposes of this disclosure, a "timing electronic" is a device that is configured to control the timing and synchronization of an optical source, scanner, and photodetector. In an embodiment, the timing electronics may be configured to ensure that a laser pulse is emitted at the correct time and that the photodetector receives the reflected light at the appropriate time. In another embodiment, the timing electronics may be configured to coordinate the movement of the scanner to ensure that the laser pulse is directed towards a target area and that the reflected light is detected from the correct angle. In some embodiments, the timing electronics may include a timing circuit, which may generate precise pulses at a specific frequency. When the reflected light returns to the LiDAR system, it may be detected by the at least a photodetector. In some embodiments, the timing electronics may be configured to measure time-of-flight of the laser pulse. For the purposes of this disclosure, "time-of-flight" is the time it takes for a pulse of light to travel to a target area and back to LIDAR system. In some embodiments, based on the time-of-flight measurement and the speed of light, the distance to the target, such as but not limited to, a vehicle, can be calculated.

Still referring to FIG. 1A, in some embodiments sensor 128 may be equipped with a machine vision system. A machine vision system may use images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ϕ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1A, An exemplary machine vision camera that may be included in an environmental sensor (or an operator senser) is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Figure 1B:
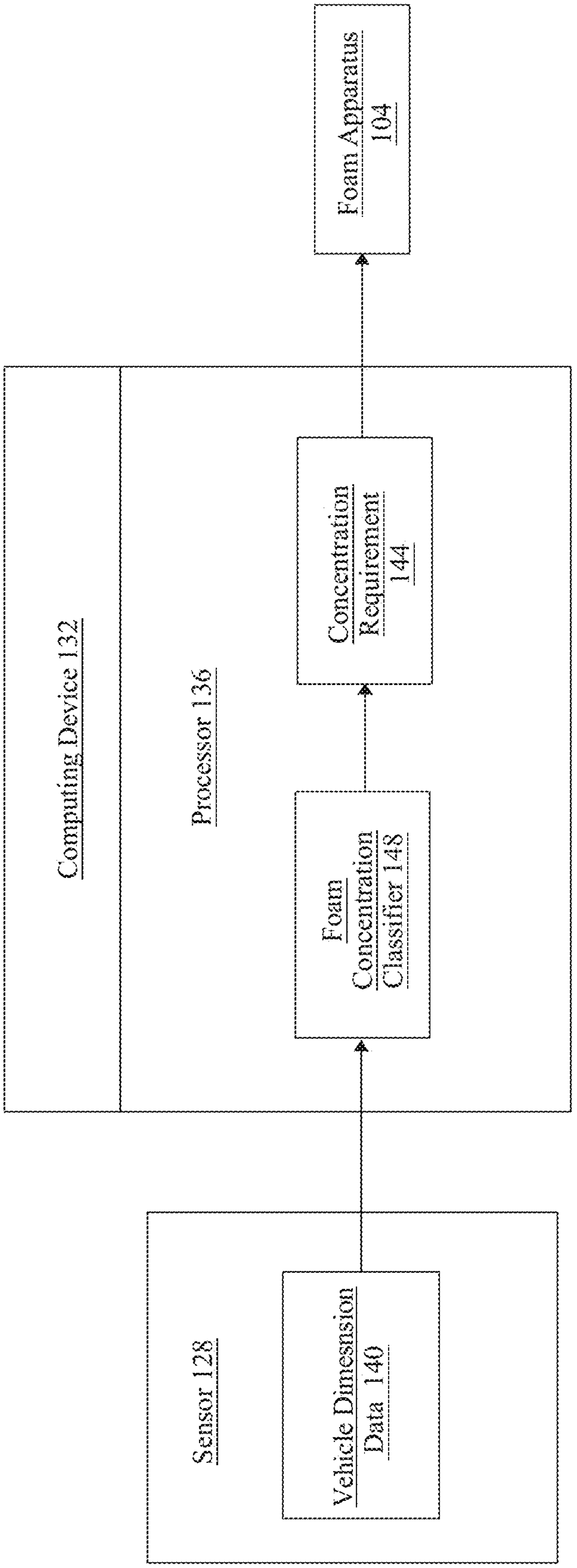
FIG. 1B is a block diagram of a computing device for calculating the concentration requirement.

Referring now to FIGS. 1A-B, a "display area," as used herein, is the combination of size, location, and orientation of a transparent surface on the vehicle. A display area may be a component of vehicle dimension data 140. A display area may be determined by computing based on vehicle dimension data 140. A transparent surface may include windows as described above. In some embodiments the display area may refer to the windscreen of vehicle. A "windscreen," as used herein, is the window located at the front of a vehicle. Sensor 128 and/or a computing device 132 may be configured to identify the location and size of display area. For example the perimeter, length, height, and width in centimeters. feet, inches, and the like. In some embodiments, apparatus 100 may include a computing device 132 configured to receive data from the sensor 128 and calculate the a vehicle surface profile. A "vehicle surface profile," as used herein, is defined as a two- or three-dimensional representation of a vehicle surface. Computing device 132 may be communicatively connected to sensor 128. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device 132. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, sensor 128 may include computing device 132.

Still referring to FIGS. 1A-B, computing device 132 includes at least a processor 136 and a memory communicatively connected to the at least a processor 136, wherein the memory contains instructions configuring the at least a processor 136 to carry out the displaying process. Computing device 132 may include any computing device 132 as described in this disclosure, including without limitation a microcontroller, and/or system on a chip (SoC) as described in this disclosure. Computing device 132 may include, be included in, and/or communicate with a mobile device such as a mobile telephone or smartphone. Computing device 132 may include a single computing device 132 operating independently, or may include two or more computing device 132 operating in concert, in parallel, sequentially or the like; two or more computing devices 132 may be included together in a single computing device 132 or in two or more computing devices 132. Computing device 132 may interface or communicate with one or more additional devices as described below in further detail via a network interface device. Network interface device may be utilized for connecting computing device 132 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 132, and any combinations thereof. A network may employ a wired and/or a wireless mode of communication. In general, any network topology may be used. Information (e.g., data, software etc.) may be communicated to and/or from a computer and/or a computing device 132. Computing device 132 may include but is not limited to, for example, a computing device 132 or cluster of computing devices 132 in a first location and a second computing device 132 or cluster of computing devices 132 in a second location. Computing device 132 may include one or more computing devices 132 dedicated to data storage, security, distribution of traffic for load balancing, and the like. Computing device 132 may distribute one or more computing tasks as described below across a plurality of computing devices 132 of computing device 132, which may operate in parallel, in series, redundantly, or in any other manner used for distribution of tasks or memory between computing devices 132. Computing device 132 may be implemented, as a non-limiting example, using a "shared nothing" architecture.

With continued reference to FIGS. 1A-B, computing device 132 may be designed and/or configured to perform any method, method step, or sequence of method steps in any embodiment described in this disclosure, in any order and with any degree of repetition. For instance, Computing device 132 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 132 may perform any step or sequence of steps as described in this disclosure in parallel, such as simultaneously and/or substantially simultaneously performing a step two or more times using two or more parallel threads, processor 136 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIGS. 1A-B, data received from sensor 128 may include vehicle dimension data 140. "Vehicle dimension data 140," as used herein, is defined as one or more elements of information related to a dimension of a vehicle. For example, vehicle dimension data 140 may include a maximum length (such as the largest possible distance from one element of the vehicle to another element of the vehicle when measuring a straight line parallel to both the ground plane on which the vehicle rests and a principal direction of travel of the vehicle), a maximum width (such as the largest possible distance from one element of the vehicle to another element of the vehicle when measuring a straight line parallel to the ground plane on which the vehicle rests and perpendicular to a principal direction of travel of the vehicle), a maximum height of the vehicle (such as the largest orthogonal distance from a ground plane on which the vehicle rests to a physical element of the vehicle), a maximum length, width, or height of a component of the vehicle, a coordinate of an element of the vehicle such as a point on an outer surface of the vehicle, a location of an element of the vehicle in relation to another point or element or component of the vehicle, a location of an element of the vehicle in relation to a reference point separate from the vehicle, a plurality of points defining a surface of a vehicle (for example three dimensional representation of LiDAR or laser rangefinder data such as a point cloud), and the like. "A principal direction of travel of the vehicle," as used herein, is defined as a direction that that the vehicle is designed to travel while moving in a straight line. In an additional or alternative embodiment, computing device 132 may determine vehicle dimension data 140 by calculating, analyzing, transforming, or extracting elements of sensor data. Computing device 132 may compare sensor data with a calibration measurement, for example time of flight data indicating that a sensor reading of 0.00003 s corresponds to a point 3.5 feet away from the sensor. Computing device 132 may then take multiple readings of a vehicle, for example multiple readings with a single sensor or multiple readings with a plurality of sensors. Computing device 132 may be configured by instructions contained on memory to calibrate the location of the one or more sensors, e.g. by assigning at least one spatial coordinate to the sensor location. Computing device 132 may then determine the location of one or more objects detected in sensor data such as a vehicle by determining the distance and angle from the sensor to the object in a coordinate system such as a cartesian, cylindrical, or spherical coordinate system and may measure the distance between points to determine one or more dimensions of a vehicle. Generation methods and embodiments of vehicle surface profile and vehicle dimension data 140 may include embodiments as disclosed in U.S. patent application Ser. No. 18/195,633, filed on May 10, 2023, entitled "METHODS AND APPARATUSES FOR VEHICLE DIMENSIONING IN A CAR WASH," the entirety of which is incorporated as a reference.

Still referring to FIGS. 1A-B, in some embodiments, apparatus 100 may include a computing device 132 configured to receive data from the sensor 128 and calculate the concentration requirement 144. Computing device 132 may be communicatively connected to sensor 128. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device 132. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, sensor 128 may include computing device 132.

Still referring to FIGS. 1A-B, a "concentration requirement," as used herein, is a concentration of a foam to be dispersed on a display area that allows for the display of digital content. A suitable concentration may be based on the amount of foam required to be dispersed in order to display digital content on top of the foam. "Digital content," as used herein is, any content that exists in the form of digital data. Digital content may include videos, photographs, and other types of digital media. In an embodiment, digital content may additionally be representative of items such as photographs, statues, buildings, paintings, art, and the like. The threshold for the concentration requirement 144 may be generated based on of the size, shape, and orientation of display area. In some embodiments calculating the concentration threshold may include training a utilizing a machine-learning model as described throughout this disclosure. A machine-learning-model may include a foam concentration classifier 148. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A foam concentration classifier 148 may be configured to output at least a datum that labels or otherwise identifies a set of data that are clustered together, found to be close under a distance metric as described below, or the like. Computing device 132 and/or another device may generate classifier using a classification algorithm, defined as a processes whereby a computing device 132 derives a classifier from training data. A foam concentration training data set may include training data correlating a display area, vehicle data dimensions, and/or a vehicle profile to a foam concentration threshold. In some embodiments, foam concentration training data may correlate a foam concentration threshold to a type of digital content. For example, a foam concentration required to display colorful or one tome images. In some embodiments, training data may be received from a display database. A "display database," as used herein, is a data structure populated with information related to displaying digital content of a vehicle. Display database may be populated with foam concentrations correlated to types of digital content. In some embodiments, display database may include survey of reviews regarding the quality of display of digital content using apparatus 100. For example, a review may rate the quality of graphics, colors, foam concentration and the like. Databases, as disclosed herein, may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIGS. 1A-B, classification may be performed using, without limitation, linear classifiers such as without limitation logistic regression and/or naive Bayes classifiers, nearest neighbor classifiers such as k-nearest neighbors classifiers, support vector machines, least squares support vector and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIGS. 1A-B, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm: $l=\sqrt{\sum_{i=0}^{n} a_i^2}$ where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIGS. 1A-B, computing device 132 may transmit the concentration requirement to foam apparatus 104, wherein foam apparatus 104 is configured to disperse a foam concentration based on the concentration requirement 144 onto the display area of a vehicle. After the dispersion of foam, computing device 132 may be configured to confirm the presence/coverage of foam within the dimensions of the display area. Sensor 128 may be equipped with an LiDAR system or a machine vision system as described above to capture image data an register the presence of foam upon the display area. For example, using a machine vison system, sensor 108 may deploy a feature detection protocol. For example, a feature detection protocol may include blob detection. "Blob detection," as used herein is a method of detecting regions in a digital image that differ in properties, such as brightness or color, compared to surrounding regions. A blob may be a region of an image in which some properties are constant or approximately constant; all the points in a blob may be considered in some sense to be similar to each other. A blob detection may be used for texture analysis and texture recognition, such as the recognition of a foam texture in image data.

Still referring to FIGS. 1A-B, apparatus 100 includes a display device 154 configured to display a plurality of digital content onto the vehicle, wherein the display device includes a digital content projector, and the plurality of digital content is displayed as a function of the adequate display condition. An "adequate display condition," as used herein, are parameters regarding the dispersion of foam and display of digital content. Parameters may refer to the location for the display and the concentration requirement 144. In some embodiments, foam classifier may receive the location, size and shape of a display area and output the adequate display condition. Computing device 132 may then transmit the adequate display condition to foam apparatus 104 to disperse the foam, and the display device 154 to display the digital content. A "display device," as used herein is a device configured to project digital content. In some embodiments, display device 154 may be communicatively connected to computing device 132 or include computing device 132. Display device 154 may include a 2D projector to display digital content in 2D. Display device 154 may include a 3D projector to display digital content in 3D. A "digital content projector," as used herein, a specialized computer display that projects an enlarged image onto a surface. A digital content projector may include DLP projector, LCD projector, LED projector, LCOS projector, CRT projector, and like. Display device 154 may be configured to project digital content on top of the semi-transparent foam for a preset duration of time. In so embodiments, foam classifier may include training data regarding adequate parameters for projection of digital data by display device 154. For example, parameters may include, the size of the projection, angle of projection, color gradient, and the like. Foam classifier may include display training data correlating the location, size, shape, and foam concentration to a display parameter. For example, a windscreen measurement 59 inches×31.5 inches may be correlated to a 35 inches×25 inches of an image projection.

Still referring to FIGS. 1A-B, displaying digital content on top of the semi-transparent foam may incorporate an augmented reality (AR) display. "Augmented reality," is the digital overlay. For example, AR may include digital visual elements, sounds, or other sensory stimuli delivered via technology. Display device 154 may be movable. For example, display device may be joined to a pole, shaft, or arm at a joint, such as axial joint, rotary joint swivel joint, and the like. In some embodiments, display device 154 may be attached to a robotic arm, actuators, an extendable shaft, a rotary track, and the like. In some embodiments, computing device 132 may control and adjust the movement and angle of display device by controlling the function of an arm, such as a robotic arm communicatively connected to the computer device. For example, computing device 132 may signal a robotic to arm to point display device 154 at the display area of a vehicle.

With continued reference to FIG. 1, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 1, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, actuator may include a pneumatic actuator. In some cases, a pneumatic actuator may enable considerable forces to be produced from relatively small changes in gas pressure. In some cases, an pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 1, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Figure 2:
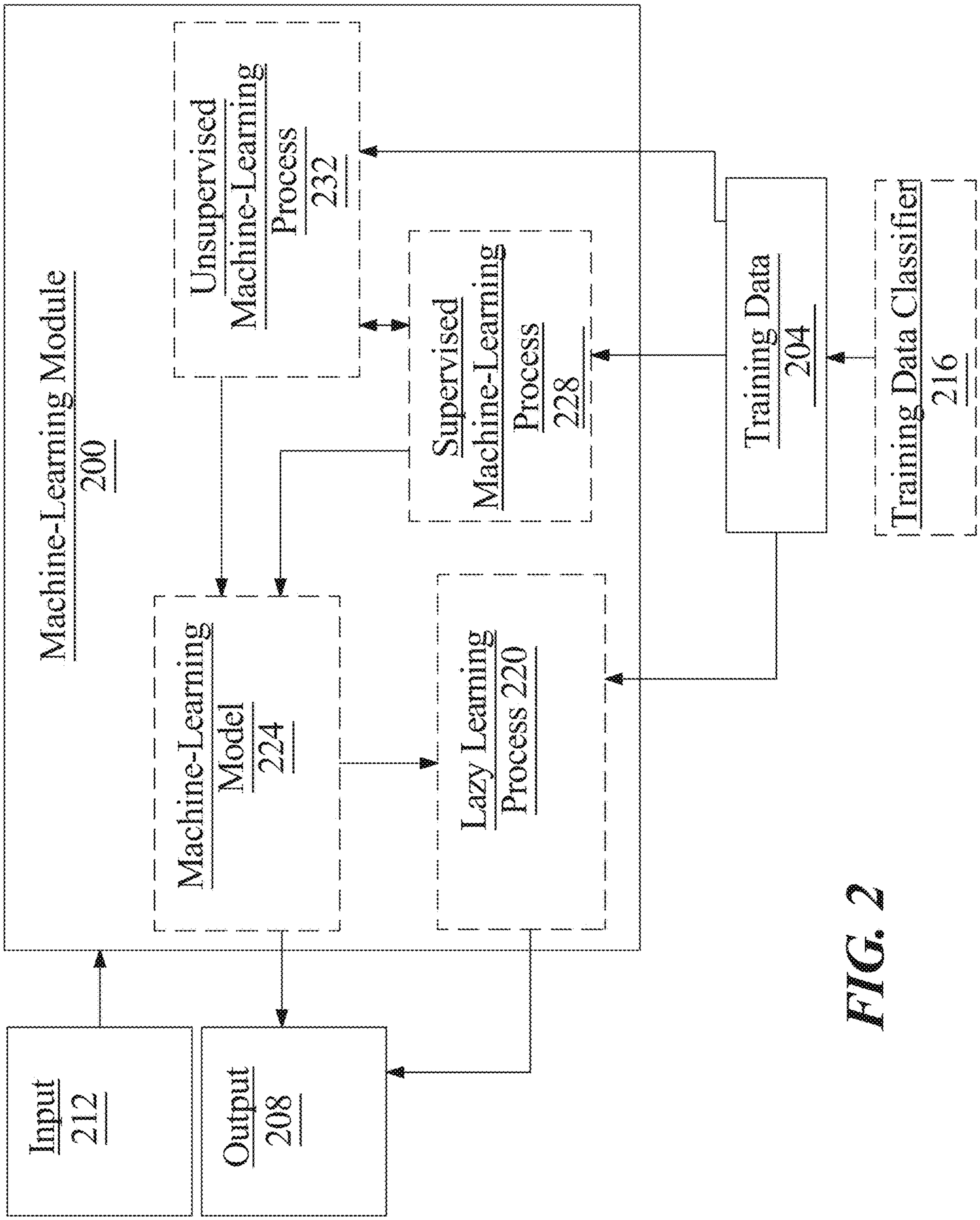
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a user goals 108 or goal datum 120 as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

For example, and still referring to FIG. 2, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, a node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Figure 3:
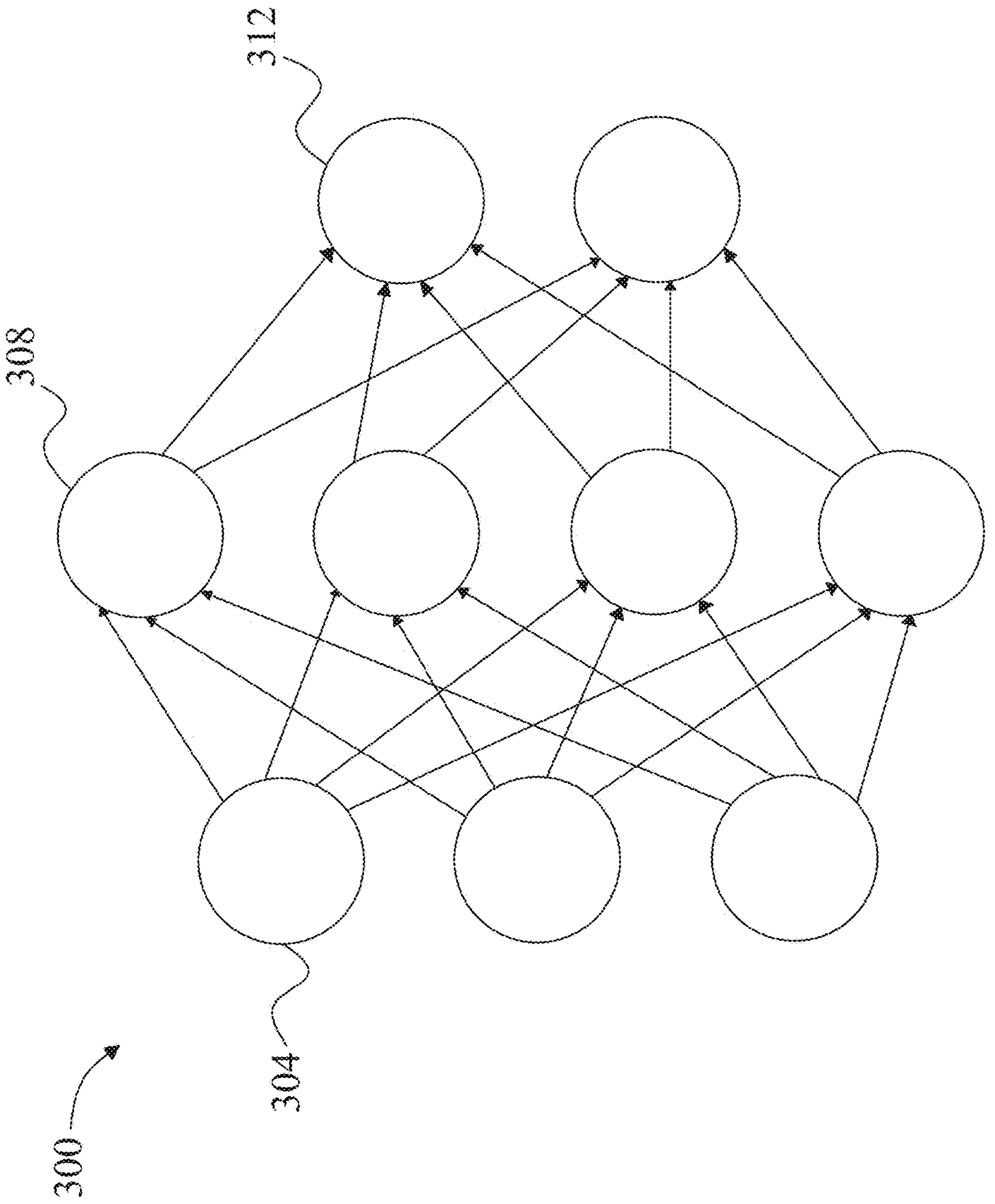
FIG. 3 is a diagram of an exemplary embodiment of neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 303, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
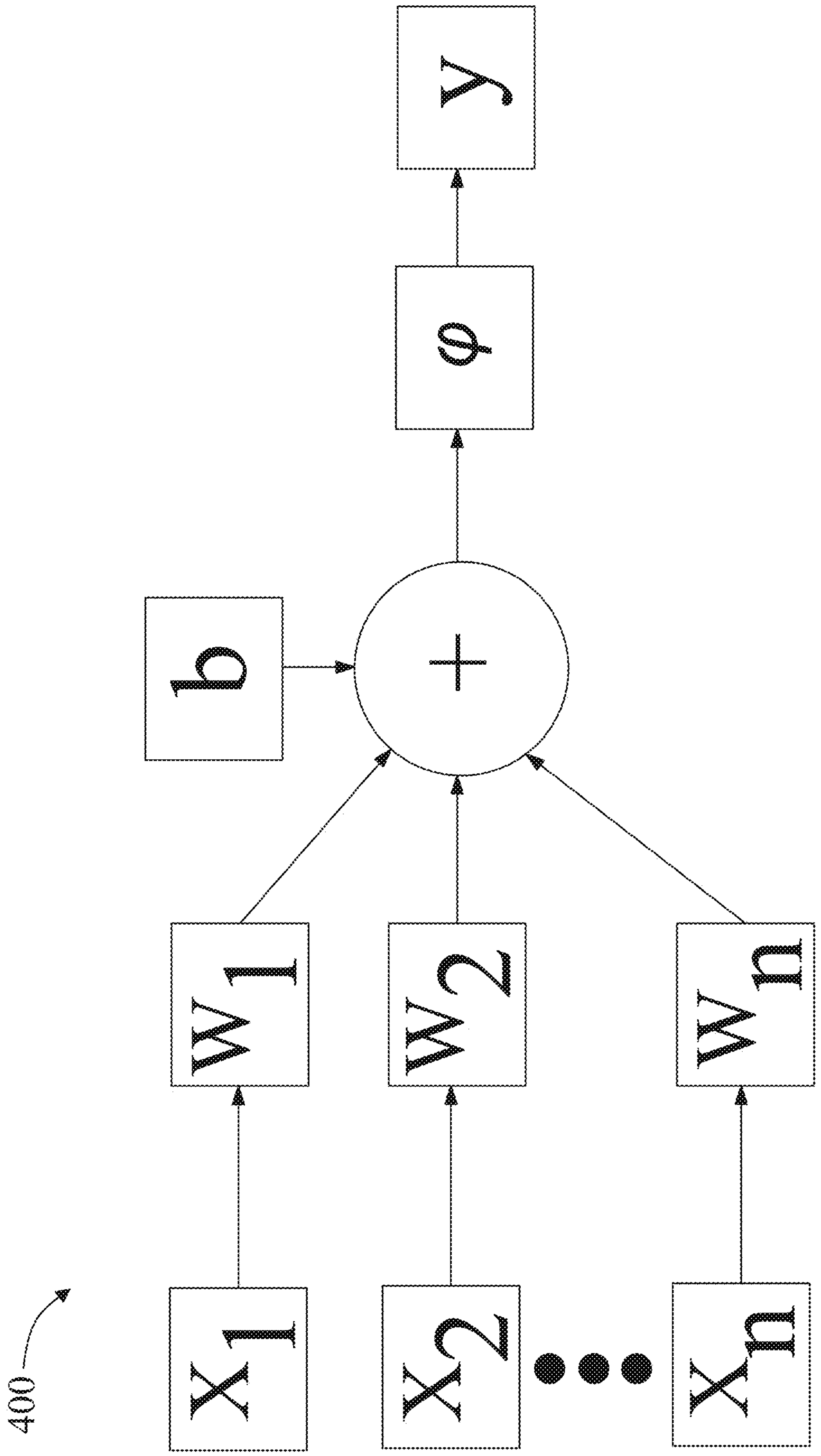
FIG. 4 is a diagram of an exemplary embodiment of a node of a neural network.

Referring now to FIG. 4, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
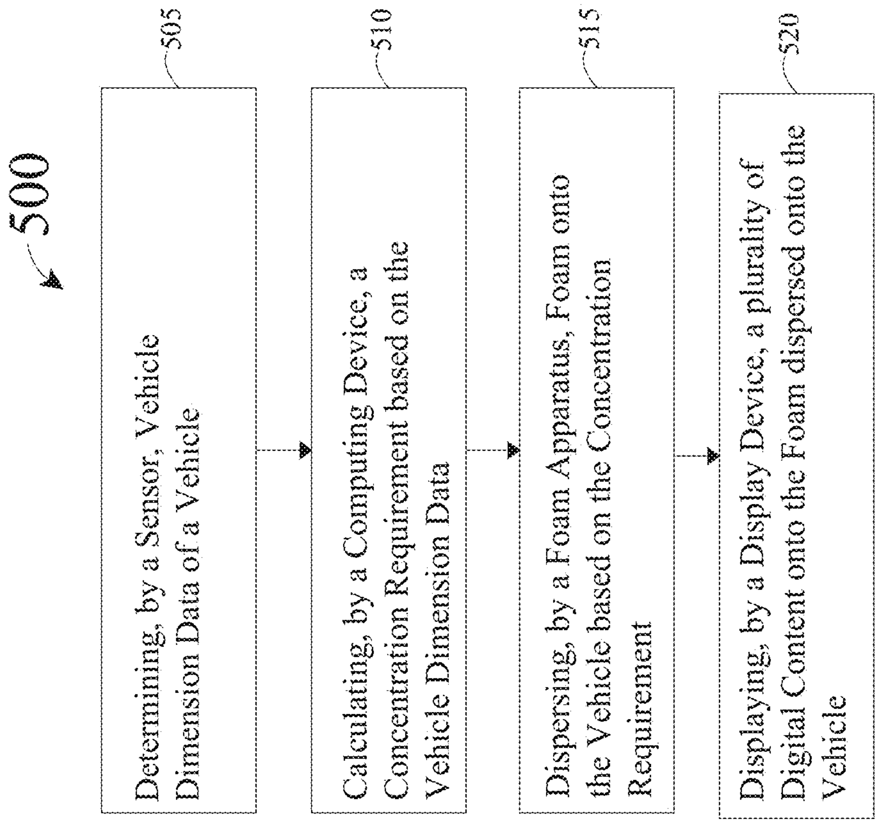
FIG. 5 is a flow diagram of an exemplary method for displaying digital content onto a vehicle.

Referring not to FIG. 5, an exemplary flow diagram of a method 500 for displaying digital content onto a vehicle is illustrated. At step 505, method 500 includes determining, by a sensor, vehicle dimension data of a vehicle, for example, and as implemented in FIGS. 1-6. The sensor may include an optical sensor. The optical sensor may include a machine vision system. The optical sensor may include a LiDAR system. At step 510, method 500 includes calculating, by a computing device, a concentration requirement based on the vehicle dimension data, for example, and as implemented in FIGS. 1-6. The concentration requirement may include a concentration of a foam to be dispersed onto a display area that allows for the display of digital content. Calculating the concentration requirement may includes receiving a foam concentration training data set correlating a display area to a foam concentration threshold, training a foam concentration classifier as a function of the foam concentration training data set, and outputting, using the foam concentration classifier, a concentration requirement. At step 515, method 500 includes dispersing, by a foam apparatus, foam onto the vehicle based on the concentration requirement, for example, and as implemented in FIGS. 1-6. The foam apparatus may include a water reservoir and a chemical reservoir connected to a pump station and spray nozzle by a supply line. The foam may include a semi-translucent composition configured to coat the window of a vehicle. The sensor may be further configured to confirm the dispersion of the foam. At step 520, method 500 includes displaying, by a display device including a digital content projector, a plurality of digital content onto the foam dispersed onto the vehicle, for example, and as implemented in FIGS. 1-6. The digital content projector may include a 3D projector.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
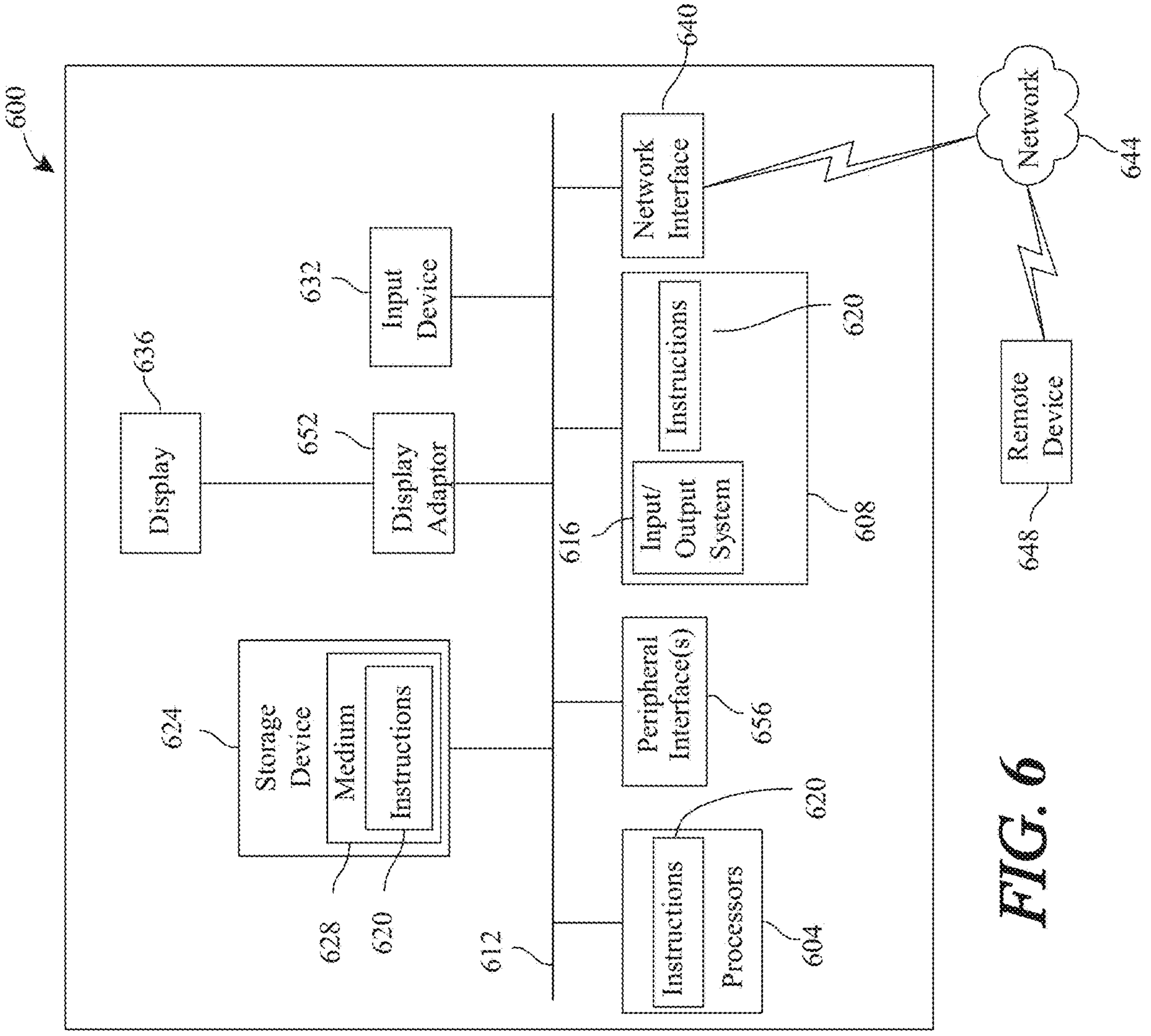
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for displaying digital content onto a vehicle, the apparatus comprising:

a foam apparatus;

a sensor configured to detect vehicle dimension data;

at least a processor; and a memory communicatively connected to the at least a processor, wherein the memory contains instructions configuring the at least a processor to:

receive the vehicle dimension data;

calculate a foam concentration requirement based on the vehicle dimension data, wherein calculating the foam concentration requirement comprises:

generating a foam concentration training data set, wherein the foam concentration training data set correlates a display area to a foam concentration threshold;

training a foam concentration classifier as a function of the foam concentration training data set;

outputting, using the foam concentration classifier, the foam concentration requirement; and transmit the foam concentration requirement to the foam apparatus, wherein the foam apparatus is configured to disperse foam onto the vehicle based on the foam concentration requirement; and a display device comprising a digital content projector, wherein the display device is configured to display a plurality of digital content onto the foam dispersed onto the vehicle.

2. The apparatus of claim 1, wherein the sensor comprises an optical sensor.

3. The apparatus of claim 2, wherein the optical sensor comprises a machine vision system.

4. The apparatus of claim 2, wherein the optical sensor comprises a Light Detection and Ranging (LiDAR) system.

5. The apparatus of claim 1, wherein the digital content projector comprises a 3D projector.

6. The apparatus of claim 1, wherein the foam apparatus comprises a water reservoir and a chemical reservoir connected to a pump station and spray nozzle by a supply line.

7. The apparatus of claim 1, wherein the foam comprises a semi-translucent composition configured to coat the window of the vehicle.

8. The apparatus of claim 1, wherein the concentration requirement comprises a concentration of the foam to be dispersed onto the display area that allows for the display of digital content.

9. The apparatus of claim 1, wherein the sensor is further configured to confirm the dispersion of the foam.

10. A method for displaying digital content onto a vehicle, the method comprising:

determining, by a sensor, vehicle dimension data of a vehicle;

calculating, by a computing device, a foam concentration requirement based on the vehicle dimension data, wherein calculating the foam concentration requirement comprises:

generating a foam concentration training data set, wherein the foam concentration training data set correlates a display area to a foam concentration threshold;

training a foam concentration classifier as a function of the foam concentration training data set;

computing, using the foam concentration classifier, the foam concentration requirement; and transmit the foam concentration requirement to a foam apparatus;

dispersing, by the foam apparatus, foam onto the vehicle based on the foam concentration requirement;

displaying, by a display device comprising a digital content projector, a plurality of digital content onto the foam dispersed onto the vehicle.

11. The method of claim 10, wherein the sensor comprises an optical sensor.

12. The method of claim 11, wherein the optical sensor comprises a machine vision system.

13. The method of claim 11, wherein the optical sensor comprises a Light Detection and Ranging (LiDAR) system.

14. The method of claim 10, wherein the digital content projector comprises a 3D projector.

15. The method of claim 10, wherein the foam apparatus comprises a water reservoir and a chemical reservoir connected to a pump station and spray nozzle by a supply line.

16. The method of claim 10, wherein the foam comprises a semi-translucent composition configured to coat the window of the vehicle.

17. The method of claim 10, wherein the concentration requirement comprises a concentration of the foam to be dispersed onto display area that allows for the display of digital content.

18. The method of claim 10, wherein the dispersing the foam further comprises confirming, by the sensor the dispersion of the foam.

* * * * *